(12) United States Patent
Bonnet

(10) Patent No.: US 11,418,598 B2
(45) Date of Patent: Aug. 16, 2022

(54) SYSTEM FOR EXCHANGING DATA IN AN AIRCRAFT

(71) Applicant: SAFRAN AIRCRAFT ENGINES, Paris (FR)

(72) Inventor: Guillaume Bonnet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 60 days.

(21) Appl. No.: 17/252,071

(22) PCT Filed: Jun. 25, 2019

(86) PCT No.: PCT/FR2019/051561
§ 371 (c)(1),
(2) Date: Dec. 14, 2020

(87) PCT Pub. No.: WO2020/002824
PCT Pub. Date: Jan. 2, 2020

(65) Prior Publication Data
US 2021/0258384 A1    Aug. 19, 2021

(30) Foreign Application Priority Data

Jun. 25, 2018 (FR) .................................. 18 55638

(51) Int. Cl.
*H04L 67/12* (2022.01)
*G08C 15/00* (2006.01)

(52) U.S. Cl.
CPC ............. *H04L 67/12* (2013.01); *G08C 15/00* (2013.01)

(58) Field of Classification Search
CPC .................................. H04L 67/12; G08C 15/00

USPC ....................................................... 340/286.02
See application file for complete search history.

(56) References Cited

U.S. PATENT DOCUMENTS

| | | | |
|---|---|---|---|
| 9,015,018 B2* | 4/2015 | Bommer | H04W 16/18 703/1 |
| 2009/0243895 A1 | 10/2009 | Mitchell et al. | |
| 2011/0199976 A1* | 8/2011 | Mitchell | H01Q 1/007 370/328 |
| 2011/0216865 A1* | 9/2011 | Qi | H04L 7/00 375/371 |
| 2017/0259942 A1* | 9/2017 | Ziarno | G05B 23/0283 |
| 2018/0162549 A1 | 6/2018 | Ziarno | |
| 2018/0170575 A1 | 6/2018 | Ziarno | |

OTHER PUBLICATIONS

International Search Report dated Sep. 27, 2019 in PCT/FR2019/051561 filed on Jun. 25, 2019, 2 pages.
Preliminary French Search Report dated Feb. 22, 2019 in French Application No. 18 55638 filed on Jun. 25, 2018, 1 page.

* cited by examiner

*Primary Examiner* — Kerri L McNally
(74) *Attorney, Agent, or Firm* — Oblon, McClelland, Maier & Neustadt, L.L.P.

(57) ABSTRACT

A system for exchanging data in an aircraft between at least two on-board devices which are interconnected by a communication link clocked at a predetermined link frequency, a first device being configured so as to: acquire measuring signals at frequencies native to the measuring signals; create frames on the basis of the measuring signals according to the native frequencies; and transmit the frames at the predetermined link frequency to a second device via the communication link.

9 Claims, 3 Drawing Sheets

SYSTEM FOR EXCHANGING DATA IN AN AIRCRAFT

Figure 1:
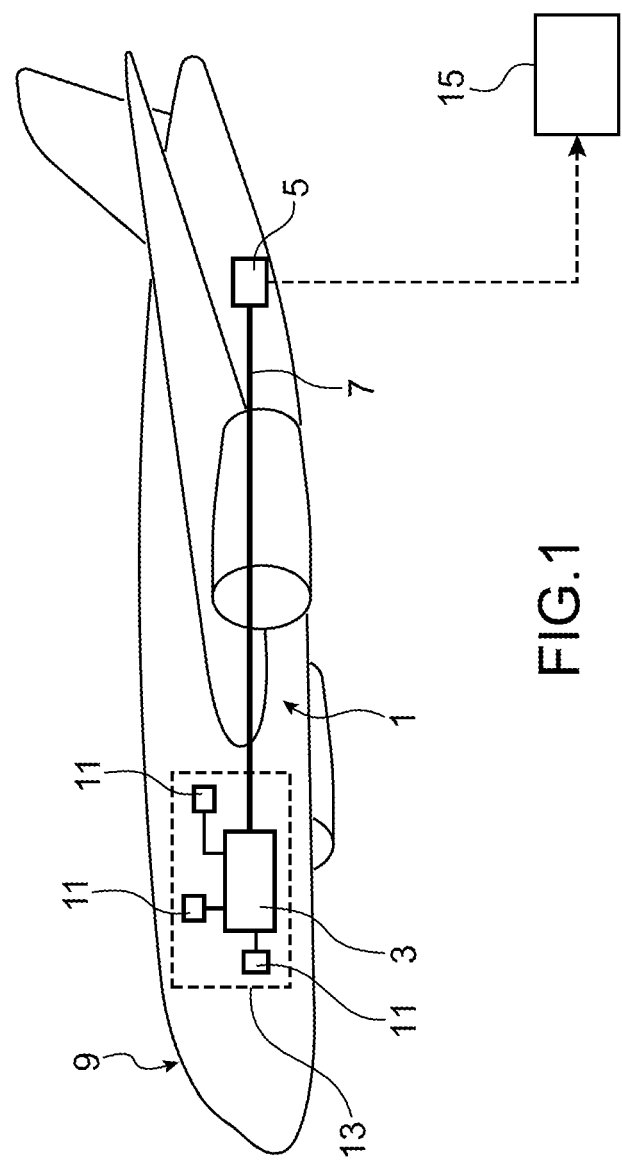

The present invention relates to the field of data exchange in an aircraft between two on-board devices which are interconnected by a communication link clocked at a predetermined link frequency and more particularly, for data relating to the monitoring of an aircraft engine.

An aircraft engine is regularly monitored by an on-board computer that collects data from a plurality of sensors disposed in the engine and the environment thereof. Said monitoring data are recorded in the computer and are partially processed by said latter.

Furthermore, the monitoring data must be provided to ground stations in order to perform a more in-depth analysis. More specifically, the monitoring data collected by the monitoring computer must first of all be transferred to an on-board recording device in the aircraft. Said latter is suitable for recording the monitoring data received from the monitoring computer. The monitoring data are in general recovered by the ground stations at the end of the flight in order to monitor the correct operation of the engine. Said monitoring data are processed immediately in the case of obvious anomalies and otherwise are analysed in order to prognosticate possible maintenance operations.

However, as the monitoring of the aircraft engine is not a critical function within the meaning of certification, it is possible for reasons of costs and/or of simplicity that the hardware or software means performing said functions are not compatible in terms of frequency with the data to be processed.

Indeed, the data collected by the monitoring computer are produced at variable and fairly high native frequencies in relation to the natural frequency of the link between the monitoring computer and the recording device.

Consequently, the aim of the present invention is to simply transfer monitoring data between two on-board devices which are interconnected by a link clocked at a frequency lower than those of the monitoring data whilst using very few software and/or hardware resources.

The present invention relates to a system for exchanging data in an aircraft between at least two on-board devices which are interconnected by a communication link clocked at a predetermined link frequency, a first device comprising a buffer memory being configured to:
acquire measuring signals at frequencies native to said measuring signals, the values of said native frequencies being higher than or equal to said predetermined link frequency,
create frames on the basis of said measuring signals according to said native frequencies by storing in buffer memory said measuring signals a plurality of times at different moments, and
simultaneously transmit said frames at said predetermined link frequency via said communication link to a second device.

This makes it possible to simply and robustly send in real time data at a frequency higher than the link frequency and without any concatenation of data before the transmission thereof which minimises the storage and processing resources. In addition, this makes it possible to have a large amount of raw data at high frequencies that may be very different according to the natures thereof.

Furthermore, the device in receiver mode is configured to:
acquire said frames at said predetermined link frequency, and
concatenate the data of said frames to recreate said original measuring signals.

This makes it possible to receive the data at a frequency that is not compatible with the link frequency and without any demultiplexing of data which further minimises the processing resources for the reconstitution of the original signals.

Advantageously, the communication link is an Ethernet type link.

This makes it possible to have a wide bandwidth between the various devices for mutually exchanging a large mass of data whilst not being limited to the intrinsic throughput of a usual avionics network. In addition, this makes it possible to implement the exchange of data not subjected to certification constraints such as data relating to maintenance, by using common hardware and software.

According to one embodiment of the present invention, the device in transmitter mode is a monitoring computer of an aircraft engine, configured to monitor the operation of the engine and to detect, if applicable, anomalies.

This makes it possible to monitor the correct operation of the aircraft engine and the change of the state thereof in order to prognosticate and plan the maintenance operations with a high precision.

Advantageously, the measuring signals include digital detection data from on-board sensors in the aircraft engine and the environment thereof, and/or configuration data of said aircraft engine.

This makes it possible to have a large amount of data of various natures useful for the monitoring of the engine.

Advantageously, the device in receiver mode is configured to transmit said measuring signals to a ground station.

This makes it possible to analyse the signals and anticipate the maintenance operations on the aircraft engine.

Advantageously, said at least two on-board devices are further interconnected by an avionics network for an exchange of operational data for flying the aircraft. The avionics network is for example compliant with the ARINC or AFDX standard, etc.

The aim of the invention is also a system for monitoring an aircraft engine including the system for exchanging data according to any one of the preceding features, said system further comprising:
on-board sensors in the aircraft engine and the environment thereof, configured to measure parameters relating to the aircraft engine and the environment thereof, and
a monitoring computer of said aircraft engine, configured to record the measurements from said sensors in order to monitor the operation of said aircraft engine.

The aim of the invention is also an aircraft engine equipped with a monitoring system.

The aim of the invention is also a method for exchanging data in an aircraft at a predetermined link frequency, including the steps of:
acquiring measuring signals at frequencies native to said measuring signals, the values of said native frequencies being higher than or equal to said predetermined link frequency,
creating frames on the basis of said measuring signals according to said native frequencies by storing said measuring signals a plurality of times at different moments, and
simultaneously transmitting said frames at said predetermined link frequency.

The aim of the invention is also a computer program, likely to be implemented in the on-board devices and including code instructions suitable for implementing a method according to the invention such as described above.

Figure 2:
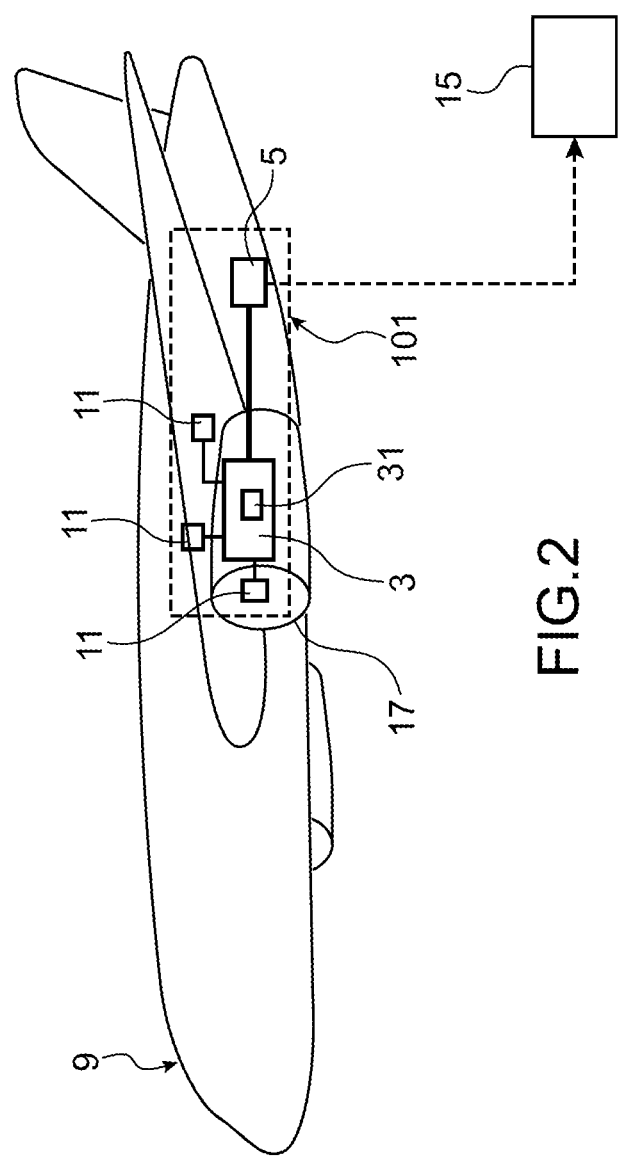
Figure 3:
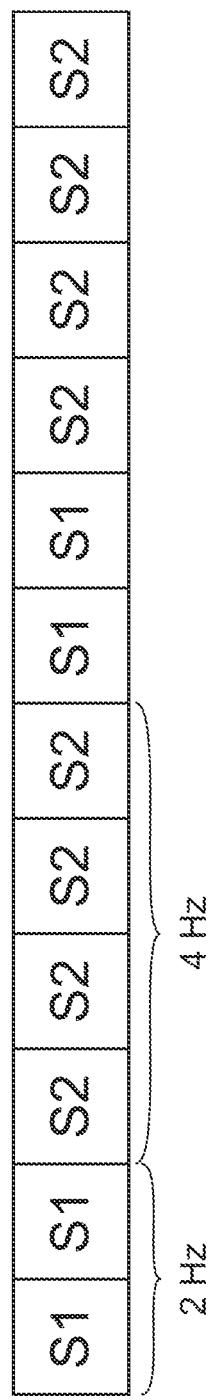

Other specific features and advantages of the device and of the method according to the invention will become clear upon reading the following description, by way of indicative and non-limiting example, with reference to the appended drawings wherein:

FIG. 1 schematically illustrates a system or method for exchanging data in an aircraft, according to one embodiment of the invention;

FIG. 2 schematically illustrates a system for monitoring an aircraft engine, according to a preferred embodiment of the invention; and FIG. 3 schematically illustrates an example of the creation and of the transmission of data, according to one embodiment of the invention.

The principle of the invention consists of sending data having high frequencies a plurality of times in order to create a lower transmission frequency.

FIG. 1 schematically illustrates a system or method for exchanging data in an aircraft, according to one embodiment of the invention.

Said system 1 includes at least two on-board transmitter-receiver devices 3, 5 and a communication link 7 interconnecting the two devices 3, 5. The communication link 7 is clocked at a predetermined link frequency.

Advantageously, the communication link 7 is based on Ethernet (IEEE Standard for Ethernet-802.3), IPv4 (Internet Standard—Protocol specification RFC 731) and UDP (Internet Standard—User Datagram Protocol specification RFC 768) protocols. The Ethernet type links make it possible to have more substantial throughputs than the links of conventional avionics systems that are based on ARINC (Aeronautical Radio Incorporated) type standards.

It will be noted that in addition to the Ethernet type communication link, the on-board transmitter-receiver devices 3, 5 may also be interconnected by an ARINC or AFDX type avionics network (not shown) for an exchange of operational data for flying the aircraft 9.

During a flight, an aircraft 9 generally carries out the recording of information on the operation thereof as well as on various environmental parameters. Said data recorded by on-board devices (for example, FADEC, ACMS, DAR, QAR, etc., type computers) are from measurements provided by measuring means or sensors 11 integrated in the aircraft 9.

The sensors 11 or measuring means are configured to collect over time signals on variables relating to the aircraft 9 and the environment thereof, and in particular to specific systems 13 (for example, the engines) of the aircraft 9. Said signals comprise operating (endogenous) data describing the behaviour of each system 13, as well as contextual (or exogenous) data describing the acquisition context.

In particular, for a specific system 13 of the aircraft 9, a first device 3, records a certain number of measuring signals including digital detection data from sensors 11 relating to the system 13. Said measuring signals make it possible for the first device 3 to monitor the correct operation of the system 13.

Before being recovered by a ground station, the measuring signals must be transferred via the communication link 7 to a second device 5 that is suitable for transferring the signals to the ground station.

However, the measuring signals are very varied and may have native frequencies higher than or equal to the predetermined link frequency of the communication link 7.

In accordance with the invention, the first device 3 is configured to store monitoring data a plurality of times at different moments before simultaneously transmitting them at the link frequency.

More specifically, the first device 3 is configured to acquire from the various sensors 11 measuring signals at frequencies native to said signals.

Subsequently, the first device 3 is configured to create frames on the basis of said measuring signals according to said native frequencies. Said frames are thus constituted gradually.

Furthermore, the first device 3 (in transmitter mode) is configured to transmit the frames at the predetermined link frequency via the communication link 7 to the second device 5.

Moreover, the second device 5 (in receiver mode) is configured to acquire the frames coming from the first device 3 at the predetermined link frequency.

Furthermore, the second device 5 is configured to concatenate the data of the frames to recreate the original measuring signals. Thus, the second device 5 obtains the original signals at the native frequencies thereof that are not compatible with the link frequency.

Moreover, the second device 5 is configured to transmit or provide the measuring signals to a ground station 15.

Indeed, the second device 5 may transfer at the end of the flight the measuring signals received from the first device 3 to a ground station according to Wi-Fi, 3/G4 type communication protocols or via a wired download.

It will be noted that the second device 5 may optionally send the measuring signals by satellite thanks to a system for transmitting digital data between the aircraft in flight and the ground.

The ground stations 15 recover the various measuring signals in order to analyse said signals and anticipate the possible maintenance operations on the aircraft 9.

FIG. 2 schematically illustrates a system for monitoring an aircraft engine, according to a preferred embodiment of the invention.

The monitoring system 101 includes the system for exchanging data according to FIG. 1 and, more particularly, includes on-board sensors 11 in the aircraft engine 17 and the environment thereof as well as a monitoring computer 3 of the aircraft engine 17.

Thus, according to this embodiment, the monitoring computer 3 corresponds to the first device in FIG. 1. The monitoring computer 3 is configured to monitor the correct operation of the engine 17 and to detect, if applicable, anomalies. In this case, the measuring signals (also called, monitoring signals) include digital detection data from the sensors 11 and/or configuration data of the aircraft engine 17.

The sensors 11 are configured to collect over time signals on variables relating to the engine 17 of the aircraft and the environment thereof, comprise endogenous data describing the behaviour of the engine 17 as well as exogenous data describing the acquisition context.

By way of example, the endogenous data may comprise the rotation speed of the shaft of the engine 17, the flow rate of the fuel, the temperatures and pressures of fluids in various locations of the engine 17 (for example, before and/or after compression), the temperature of the exhaust gases, etc.

The exogenous data may comprise the outside temperature, the altitude, the weight of the aircraft 9, the antifreeze on the wings, the speed of the aircraft 9, etc.

All of said monitoring signals make it possible to monitor the operation of the engine 17 and serve as a basis for a predictive maintenance procedure. However, said monitoring signals may have native frequencies higher than or equal to the predetermined link frequency of the communication link 7 that may be clocked at 1 Hz.

Thus, the monitoring computer 3 is configured to acquire from the various sensors 11 measuring signals at frequencies native to said signals. Said frequencies may be different for each signal and may for example have frequencies of 1 Hz, 2 Hz, 4 Hz, 8 Hz, 16 Hz, 33 Hz, 67 Hz, etc. according to the requirements.

Subsequently, the monitoring computer 3 is configured to create frames on the basis of said measuring signals according to said native frequencies.

Furthermore, the monitoring computer 3 in transmitter mode is configured to transmit the frames at the predetermined link frequency via the communication link 7 to the second device 5.

Moreover, the second device 5 in receiver mode is configured to acquire the frames coming from the monitoring computer 3 at the predetermined link frequency.

Furthermore, the second device 5 is configured to concatenate the data of the frames to recreate the original measuring signals before transmitting them to a ground station. In other words, the frames belonging to each measuring signal are quite simply placed end to end to recreate the measuring signals.

FIG. 3 schematically illustrates an example of the creation and the transmission of data, according to one embodiment of the invention.

This example illustrates two types of signals S1 and S2 having native frequencies of 2 Hz and 4 Hz respectively. Moreover, by way of example it is assumed that the communication link 7 between the first device 3 (or monitoring computer) and the second device 5 is clocked at 1 Hz.

Thus, the monitoring computer 3 collects the measuring signals S1 and S2 and creates frames according to the native frequencies of 2 Hz and 4 Hz respectively. The measuring signal S1 is created according to two consecutive frames whereas the measuring signal S2 is created according to four consecutive frames. Thus, the signal S2 is stored in buffer memory 31 of the monitoring computer 3 four times in one second at moments 1/4, 2/4, 3/4, and 4/4 whereas the signal S1 is stored in buffer memory 31 twice in one second.

When sending is possible, the data placed in buffer memory 31 are all simultaneously sent to the second device 5 via the communication link 7 at the frequency of 1 Hz.

Upon each sending, the data of the signal S1 are received by two frames and those of the signal S2 are received by four frames. Once that the data are available in the second device 5, said latter concatenates the data of the frames to recreate each measuring signal at the expected frequency.

This embodiment has the advantage of being very systematic so that whenever the data of a same moment are available, they are placed in frames that may be finalised instantaneously.

It will be noted that according to this embodiment, it is not necessary to concatenate the data before the transmission thereof by the first device 3 (or the monitoring computer) and, consequently, no demultiplexing is necessary for reconstituting the complete signal after receipt of the data by the second device 5. This facilitates the implementation of data exchanges by the first and second devices and minimises the hardware and/or software resources thereof.

The invention claimed is:

1. A system for exchanging data in an aircraft between at least two on-board devices which are interconnected by a communication link clocked at a predetermined link frequency, wherein a first device comprises a buffer memory and is configured to:
   acquire measuring signals at frequencies native to said measuring signals, the values of said native frequencies being higher than or equal to said predetermined link frequency,
   create frames on the basis of said measuring signals according to said native frequencies by storing in buffer memory said measuring signals a plurality of times at different moments, and
   simultaneously transmit said frames at said predetermined link frequency via said communication link to a second device.

2. The system according to claim 1, wherein the second device is configured to:
   acquire said frames at said predetermined link frequency, and
   concatenate the data of said frames to recreate said measuring signals.

3. The system according to claim 1, wherein the communication link is an Ethernet type link.

4. The system according to claim 1, wherein the first device is a monitoring computer of an aircraft engine, configured to monitor the operation of the engine and to detect, if applicable, anomalies.

5. The system according to claim 1, wherein the second device is configured to transmit said measuring signals to a ground station.

6. A system for monitoring an aircraft engine including the system for exchanging data according to claim 1, said system further including:
   on-board sensors in the aircraft engine and the environment thereof, configured to measure parameters relating to the aircraft engine and the environment thereof, and
   a monitoring computer of said aircraft engine, configured to record the measurements from said sensors in order to monitor the operation of said aircraft engine.

7. An aircraft engine equipped with the monitoring system according to claim 6.

8. A method for exchanging data in an aircraft at a predetermined link frequency, comprising:
   acquiring measuring signals at frequencies native to said measuring signals, the values of said native frequencies being higher than or equal to said predetermined link frequency,
   creating frames on the basis of said measuring signals according to said native frequencies by storing said measuring signals a plurality of times at different moments, and
   simultaneously transmitting said frames at said predetermined link frequency.

9. The method according to claim 8, further comprising:
   acquiring said frames at said predetermined link frequency, and
   concatenating data from said frames to recreate said measuring signals.

* * * * *